(12) United States Patent
Song et al.

(10) Patent No.: US 11,774,582 B2
(45) Date of Patent: Oct. 3, 2023

(54) IMAGING AND RADAR FUSION FOR MULTIPLE-OBJECT TRACKING

(71) Applicant: Aptiv Technologies Limited, St. Michael (BB)

(72) Inventors: Sanling Song, Northport, AL (US); Yang Zheng, Winnetka, CA (US); Izzat H. Izzat, Simi Valley, CA (US)

(73) Assignee: Aptiv Technologies Limited, St. Michael (BB)

( * ) Notice: Subject to any disclaimer, the term of this patent is extended or adjusted under 35 U.S.C. 154(b) by 333 days.

(21) Appl. No.: 17/149,588

(22) Filed: Jan. 14, 2021

(65) Prior Publication Data

US 2021/0231794 A1 Jul. 29, 2021

Related U.S. Application Data

(60) Provisional application No. 62/966,604, filed on Jan. 28, 2020.

(51) Int. Cl.
*G01S 13/89* (2006.01)
*G01S 7/41* (2006.01)
(Continued)

(52) U.S. Cl.
CPC .............. *G01S 13/89* (2013.01); *G01S 7/415* (2013.01); *G01S 7/417* (2013.01); *G01S 13/726* (2013.01);
(Continued)

(58) Field of Classification Search
CPC .... G01S 7/2923; G01S 13/584; G01S 13/726; G01S 13/89; G01S 13/42; G01S 13/931
See application file for complete search history.

(56) References Cited

U.S. PATENT DOCUMENTS 10,451,712 B1 * 10/2019 Madhow ............... G01S 13/723
10,565,468 B2    2/2020 Schiffmann
(Continued)

OTHER PUBLICATIONS

"Kurtosis", Retrieved from https://en.wikipedia.org/w/index.php?title=Kurtosis&oldid=930917675 on Dec. 18, 2020, 12 pages.
(Continued)

*Primary Examiner* — Donald H B Braswell
(74) *Attorney, Agent, or Firm* — Sawtooth Patent Group PLLC

(57) ABSTRACT

This document describes methods and systems directed at imaging sensor and radar fusion for multiple-object tracking. Using tracking-by-detection, an object is first detected in a frame captured by an imaging sensor, and then the object is tracked over several consecutive frames by both the imaging sensor and a radar system. The object is tracked by assigning a probability that the object identified in one frame is a same object identified in the consecutive frame. A probability is calculated for each data set captured by a sensor by a supervised-learning neural-network model using the data collected from the sensors. Then, the probabilities associated with each sensor are fused into a refined probability. By fusing the data gathered by the imaging sensor and the radar system in the consecutive frames, a safety system can track multiple objects more accurately and reliably than using the sensor data separately to track objects.

20 Claims, 9 Drawing Sheets

(51) Int. Cl.
  *G01S 13/72* (2006.01)
  *G01S 13/86* (2006.01)
  *G01S 13/931* (2020.01)
  *G06V 10/764* (2022.01)
  *G06V 10/80* (2022.01)
  *G06V 10/82* (2022.01)
  *G06V 20/58* (2022.01)

(52) U.S. Cl.
  CPC .......... *G01S 13/865* (2013.01); *G01S 13/867* (2013.01); *G01S 13/931* (2013.01); *G06V 10/764* (2022.01); *G06V 10/803* (2022.01); *G06V 10/82* (2022.01); *G06V 20/58* (2022.01)

(56) References Cited

U.S. PATENT DOCUMENTS

| | | |
|---|---|---|
| 2015/0324652 A1 | 11/2015 | Mizutani |
| 2017/0193310 A1* | 7/2017 | Yu .................... G06F 18/24133 |
| 2017/0206436 A1* | 7/2017 | Schiffmann ........... G01S 13/867 |
| 2019/0147372 A1 | 5/2019 | Luo et al. |
| 2019/0333232 A1* | 10/2019 | Vallespi-Gonzalez ..................... G06V 20/56 |
| 2020/0004259 A1* | 1/2020 | Gulino .................... G06F 18/00 |

OTHER PUBLICATIONS

"Kurtosis (K)", Retrieved from https://www.vosesoftware.com/riskwiki/Kurtosis(K).php on Dec. 18, 2020, 2017, 7 pages.

"Extended European Search Report", EP Application No. 21153654.5, dated Jun. 17, 2021, 12 pages.

Bhuvana, et al., "Integrated Camera and Radar Tracking using Multi-Model Cubature Kalman Filter", Nov. 11, 2019, 5 pages.

Sengupta, et al., "A DNN-LSTM based Target Tracking Approach using mmWave Radar and Camera Sensor Fusion", Jul. 15, 2019, 6 pages.

* cited by examiner

IMAGING AND RADAR FUSION FOR MULTIPLE-OBJECT TRACKING

CROSS-REFERENCE TO RELATED APPLICATION

This application claims the benefit under 35 U.S.C. 119(e) of U.S. Provisional Application No. 62/966,604, filed Jan. 28, 2020, the disclosure of which is hereby incorporated by reference in its entirety herein.

BACKGROUND

Tracking multiple objects allows a safety system to predict the paths of the objects and is crucial to improving the safety and autonomy of vehicles. The goal of multiple-object tracking is to discover multiple objects in consecutive frames of a scene and recover the identity information of these objects across the consecutive frames. Camera systems, Light Detection and Ranging (LiDAR) systems, and radar systems are widely used to accomplish these tasks. These systems continue to experience key issues that complicate multiple-object tracking, including frequent occlusions, initialization and termination of tracks, changes in appearances of the objects, and interactions among multiple objects. The challenge of improving multiple-object tracking lies in the ability to reliably identify the same objects in consecutive frames to overcome these key issues.

SUMMARY

This document describes methods and systems directed at imaging sensor and radar fusion for multiple-object tracking. Using tracking-by-detection, an object is first detected in a frame captured by an imaging sensor, and then the object is tracked over several consecutive frames by the imaging sensor and a radar system. The object is tracked by assigning a probability that the object identified in one frame is a same object identified in the consecutive frame. A probability associated with each sensor is calculated by a supervised learning neural network model using the data collected from the sensors. Then, the probabilities associated with each sensor are fused into a refined probability. By fusing the data gathered by the imaging sensor and the radar system in the consecutive frames, a safety system can track multiple objects more accurately and reliably than using the sensor data separately to track objects.

In one example, a method includes determining, based on a first frame captured by an imaging sensor, a first object within the first frame. The method further includes determining, based on a second frame captured by the imaging sensor, a second object within the second frame, the second frame captured consecutively after the capture of the first frame. The method further includes determining, based on a first radar signal received at a first time, the first time corresponding to the capture of the first frame, a location of a third object, the third object from which the first radar signal was reflected. The method further includes determining, based on a second radar signal received at a second time, the second time corresponding to the capture of the second frame, a location of a fourth object, the fourth object from which the second radar signal was reflected. The method further includes determining a first probability that the first object is a same object as the second object. The method further includes determining a second probability that the third object is a same object as the fourth object. The method further includes determining a refined probability from combining the first probability and the second probability, the refined probability that the first, second, third, and fourth objects are a same object.

In another example, a system includes an imaging sensor, a radar system, and one or more processors configured to determine, based on a first frame captured by an imaging sensor, a first object within the first frame. The one or more processors are further configured to determine, based on a second frame captured by the imaging sensor, a second object within the second frame, the second frame captured consecutively after the capture of the first frame. The one or more processors are further configured to determine, based on a first radar signal received at a first time, the first time corresponding to the capture of the first frame, a location of a third object, the third object from which the first radar signal was reflected. The one or more processors are further configured to determine, based on a second radar signal received at a second time, the second time corresponding to the capture of the second frame, a location of a fourth object, the fourth object from which the second radar signal was reflected. The one or more processors are further configured to determine a first probability that the first object is a same object as the second object. The one or more processors are further configured to determine a second probability that the third object is a same object as the fourth object. The one or more processors are further configured to determine a refined probability from combining the first probability and the second probability, the refined probability that the first, second, third, and fourth objects are a same object.

In another example, a system is described including means for determining, based on a first frame captured by an imaging sensor, a first object within the first frame. The system further includes means for determining, based on a second frame captured by the imaging sensor, a second object within the second frame, the second frame captured consecutively after the capture of the first frame. The system further includes means for determining, based on a first radar signal received at a first time, the first time corresponding to the capture of the first frame, a location of a third object, the third object from which the first radar signal was reflected. The system further includes means for determining, based on a second radar signal received at a second time, the second time corresponding to the capture of the second frame, a location of a fourth object, the fourth object from which the second radar signal was reflected. The system further includes means for determining a first probability that the first object is a same object as the second object. The system further includes means for determining a second probability that the third object is a same object as the fourth object. The system further includes means for determining a refined probability from combining the first probability and the second probability, the refined probability that the first, second, third, and fourth objects are a same object This document also describes a computer-readable storage medium comprising instructions that, when executed, configures one or more processors to perform the above-summarized method and other methods set forth herein, in addition to describing systems configured to perform the above-summarized method and the other methods set forth herein.

This summary introduces simplified concepts for using machine learning to improve multiple-object tracking systems, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of imaging and radar fusion for multiple-object tracking are described in this document with reference to the following figures. The same numbers are often used throughout the drawings to reference like features and components.

FIGS. 8-1 and 8-2 illustrate an example method for imaging and radar fusion for multiple-object tracking.

DETAILED DESCRIPTION

Overview

Tracking systems widely implement imaging sensors to track objects in the scene being imaged by the sensor. Tracking an object based on images captured by the imaging sensors is accomplished by using appearance features of the object of interest. These features include colors of the object and the relationship of pixels within the object image.

Utilizing only imaging sensors has many limitations. Many objects entering or exiting the scene, frequent occlusions, and interactions among multiple objects can complicate the ability to track these objects reliably. Adverse weather, such as fog or rain, may degrade the images captured by the sensor, making object identification more difficult.

To improve the performance of these tracking systems, radar systems are now being implemented in conjunction with the imaging sensors. Radar systems typically use Kalman filters or other similar filtering algorithms to improve the tracking of objects. While radar systems implementing these filtering algorithms have assisted the imaging systems with tracking objects, other methods, as described in this disclosure, provide more-reliable object-tracking.

A technique referred to as tracking-by-detection provides more reliability. A detection step is achieved by detecting an object in two consecutive frames captured by an imaging sensor. A tracking step involves associating an object, through machine learning, in the first frame with an object in the second, consecutive frame. This association, represented as a probability, is derived from data provided by the imaging sensor and from data provided by the radar and results in an imaging-based association and a radar-based association. These two associations are then fused into a more accurate, refined association.

Example Environment

Figure 1:
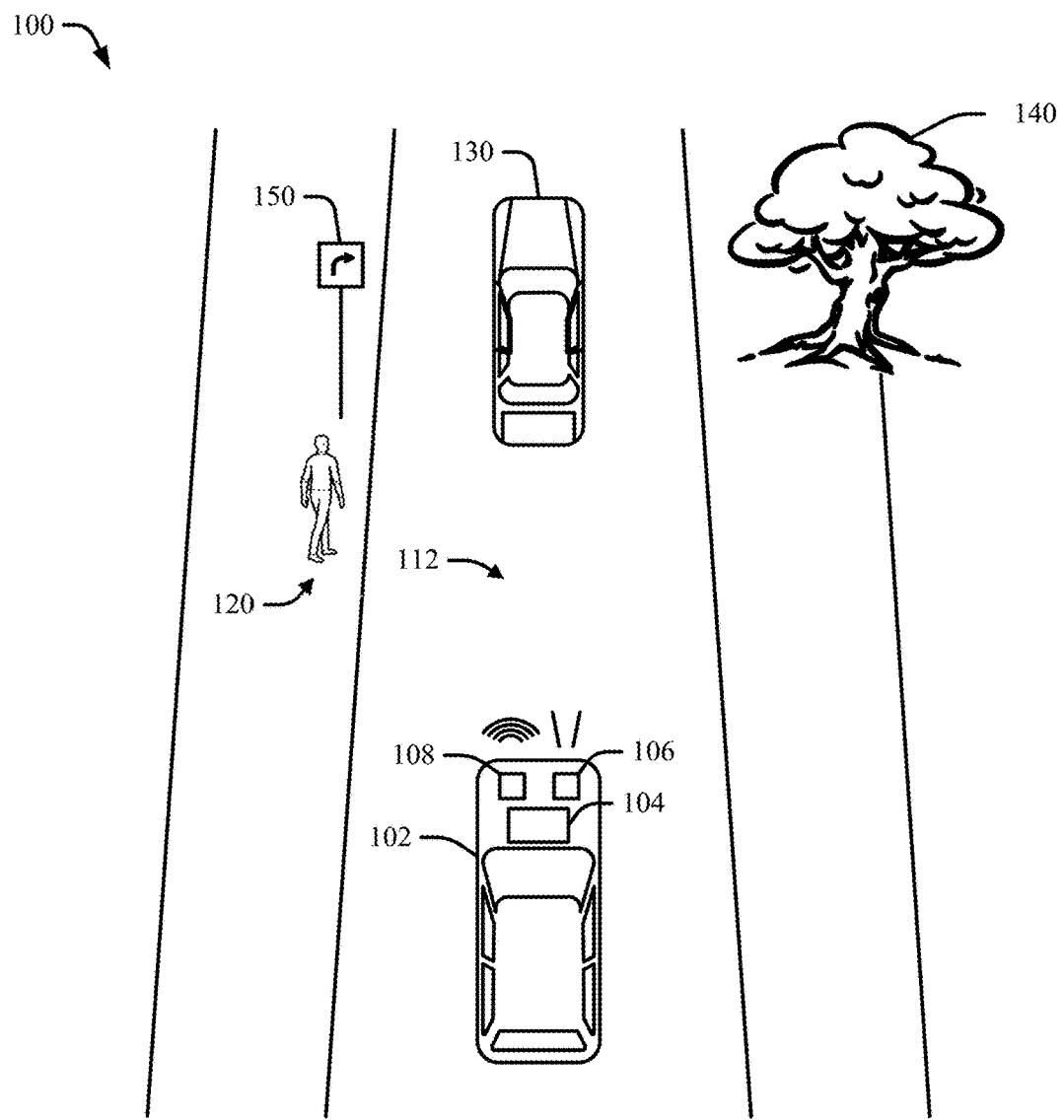
FIG. 1 illustrates an example environment in which a system is configured to perform imaging and radar fusion for multiple-object tracking, in accordance with techniques of this disclosure.

FIG. 1 illustrates an example environment 100 in which a vehicle 102 is configured to perform imaging and radar fusion for multiple-object tracking, in accordance with techniques of this disclosure. In the depicted environment 100, a safety system 104 is mounted to, or integrated within, the vehicle 102. Although illustrated as a car, the vehicle 102 can represent other types of vehicles and machinery (e.g., a motorcycle, a bus, a tractor, a semi-trailer truck, watercraft, aircraft, or other heavy equipment), including manned and unmanned systems that may be used for a variety of purposes. The vehicle 102 can travel on a road 112, which may be lined with vegetation 140, a street sign 150, or other stationary objects (not shown), including buildings and parked vehicles. Moving objects, for example, a pedestrian 120 and a moving vehicle 130 may also be in or near the road 112. In FIG. 1, the vehicle 102 is traveling down the road 112, and the safety system 104 of the vehicle 102 has a field-of-view (FOV) that encompasses the road 112 in addition to the pedestrian 120, the moving vehicle 130, the vegetation 140, and the street sign 150.

The safety system 104 can track objects in the FOV based on sensor data obtained from multiple sensors of the vehicle 102. Identifying objects between multiple sensors and fusing the data from these sensors enables the safety system to more accurately and reliably track objects that may need to be avoided as the vehicle 102 navigates the road 112.

In general, the safety system 104 includes multiple sensors (e.g., optical camera, LiDAR, radar) mounted to the vehicle 102 with an FOV in any direction away from the vehicle 102 and an object-tracking module 110. In FIG. 1, an imaging sensor 106 and a radar sensor 108 are mounted to vehicle 102 with an FOV facing forward of vehicle 102. The imaging sensor 106 and the radar sensor 108 can capture data on any object within this FOV, including the pedestrian 120, the moving vehicle 130, the vegetation 140, and the street sign 150.

In FIG. 1, an object-tracking module 110 is mounted in or near the engine bay of vehicle 102, though vehicle manufacturers can integrate the object-tracking module 110 into any location in the vehicle. For example, the object-tracking module 110 can be located behind a dash, under a seat, or near a trunk of vehicle 102. The object-tracking module 110 interfaces with the imaging sensor 106 and the radar sensor 108 to receive data. The sensors, mounted on or otherwise integrated into the vehicle 102, are continuously capturing data, either as consecutive frames captured by the imaging sensor 106 in this example, or as radar signals captured by the radar sensor 108 in this example, received at consecutive times corresponding to the consecutive frames captured by the imaging sensor 106.

For each sensor, the object-tracking module 110 receives the data, and, based on objects detected from this data, assigns probabilities that an object identified in a second set of received data is the same object as an object received in a first set of data. The first set and second set of received data can be data received from the imaging sensor 106, the radar sensor 108, or both. The object-tracking modules then fuses the probabilities related to data from the imaging sensor 106 with the probabilities related to data from the radar sensor 108, resulting in a refined probability.

Figure 2:
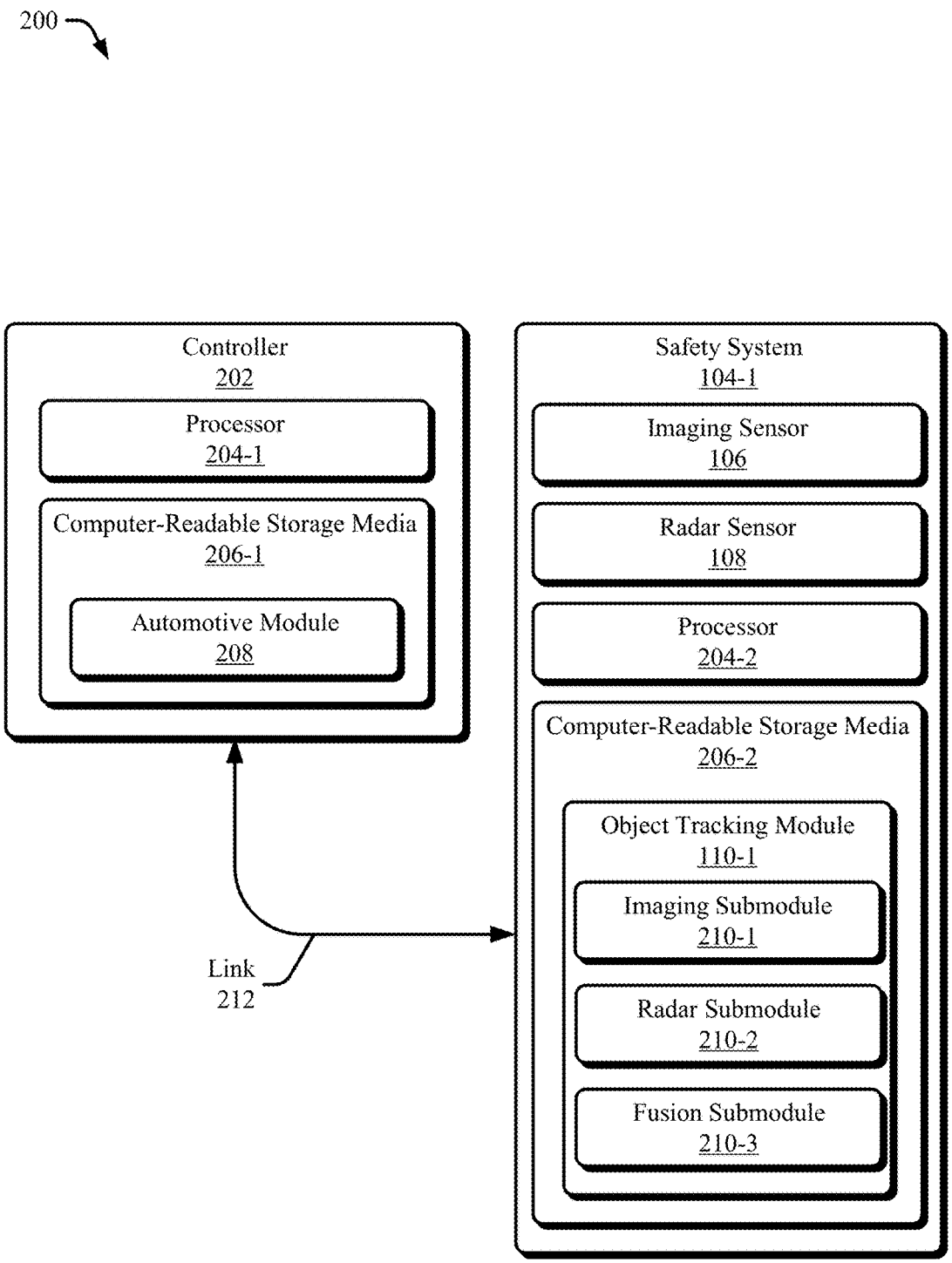
FIG. 2 illustrates an example of an automotive system configured to perform imaging and radar fusion for multiple-object tracking, in accordance with techniques of this disclosure.

FIG. 2 illustrates an example of an automotive system 200 configured to perform imaging and radar fusion for multiple-object tracking, in accordance with techniques of this disclosure. The system 200 can be integrated within the vehicle 102. For example, the automotive system 200 includes a controller 202 and a safety system 104-1, which is an example of the safety system 104. The safety system 104-1 can be integrated within an automotive or other vehicular environment. The safety system 104-1 can communicate with the controller 202 over a link 212, such as data output from the safety system 104-1 as object tracks in the FOV are identified.

The controller 202 includes a processor 204-1 and a computer-readable storage medium (CRM) 206-1 (e.g., a memory, long-term storage, short-term storage), which stores instructions for an automotive module 208. The safety system 104-1 includes a radar sensor 108 in addition to the imaging sensor 106. Any number of other sensors may likewise be used. The safety system 104-1 may include processing hardware that includes a processor 204-2 and a computer-readable storage medium (CRM) 206-2, which stores instructions associated with an object-tracking module 110-1. The object-tracking module 110-1, which is an example of the object-tracking module 110, includes an imaging submodule 210-1, a radar submodule 210-2, and a fusion submodule 210-3.

The processors 204-1 and 204-2 can be two separate or a single microprocessor or a pair of or a single system-on-chip of a computing device, a controller, or a control unit. The processors 204-1 and 204-2 execute computer-executable instructions stored within the CRMs 206-1 and 206-2. As an example, the processor 204-1 can execute the automotive module 208 to perform a driving function or other operation of the automotive system 200. Similarly, the processor 204-2 can execute the object-tracking module 110-1 to infer objects in the FOV based on sensor data obtained from multiple different sensors, such as the imaging sensor 106 and the radar sensor 108. The automotive module 208, when executing at the processor 204-1, can receive an indication of one or more objects tracked by the object-tracking module 110-1 in response to the object-tracking module 110-1 combining and analyzing sensor data generated at each of the sensors (e.g., the imaging sensor 106 and the radar sensor 108).

The object-tracking module 110-1 receives data from the imaging sensor 106 and the radar sensor 108. The data received by the imaging sensor 106, represented as two consecutive frames in this example, is input into the imaging submodule 210-1. The imaging submodule 210-1 identifies an object within the two consecutive frames and outputs a probability that the object in the second frame identifies with the object in the first frame. Similarly, the data received by the radar sensor 108, represented as radar signals received after reflecting off an object at two times and corresponding to the capture of the two frames by the imaging sensor 106, is input into the radar submodule 210-2. The radar submodule 210-2 outputs a probability that the two reflected radar signals are reflected off the same object. The fusion submodule 210-3 receives the probability that is output by the imaging submodule 210-1 and the probability that is output by the radar submodule 210-2, fuses the two probabilities, and outputs a refined probability. When multiple objects are identified in the captured frames and the received radar signals, the multiple probabilities output by the submodules 210 are presented as data-association matrices. Each row of the data-association matrix represents an object found in a first frame or by a reflected radar signal received at a first time corresponding to the first frame. Each column of the data-association matrix represents an object found in a second frame or by a reflected radar signal received at a second time corresponding to the second frame. Each element in the data-association matrix is a probability that the object, identified in the second frame or by the reflected radar signal received at the second time corresponding to the second frame, is the same object identified in the first frame or by the reflected radar signal received at the first time corresponding to the first frame.

Figure 3:
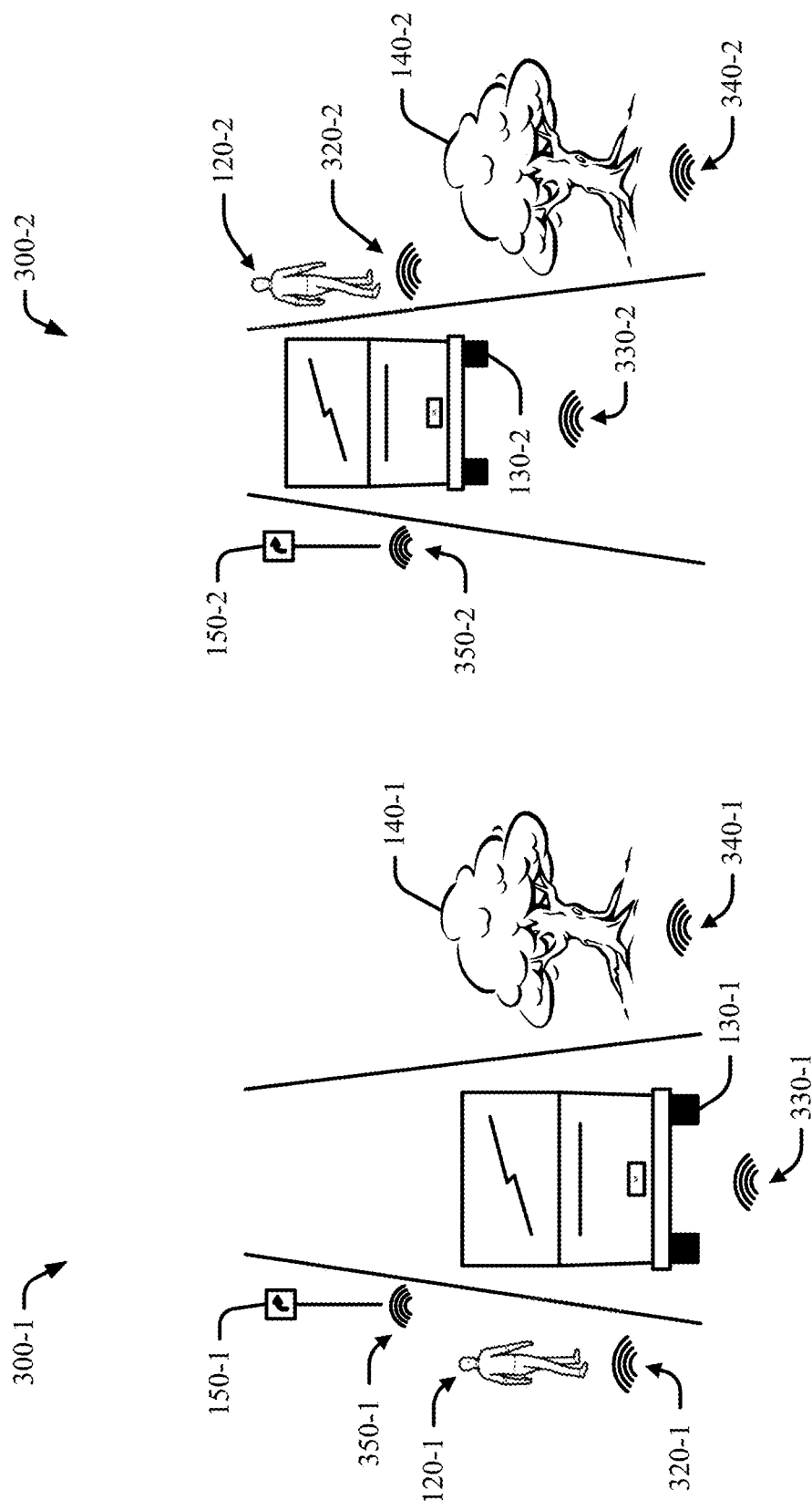
FIG. 3 illustrates consecutive frames, captured by an imaging sensor, of an example operating environment.

FIG. 3 illustrates two consecutive frames captured by the imaging sensor 106 of the example environment 100. Frame 300-1 is a first frame captured by the imaging sensor 106, and frame 300-2 is a second, consecutive frame captured by the imaging sensor 106. In frame 300-1, objects are detected and identified, including the pedestrian 120-1, the vehicle 130-1, the vegetation 140-1, and the street sign 150-1. Radar signal 320-1 of the pedestrian 120-1, the radar signal 330-1 of the vehicle 130-1, radar signal 340-1 of the vegetation 140-1, and radar signal 350-1 of the street sign 150-1 are received by the radar sensor 108 at a time corresponding to the time frame 300-1 is captured. Likewise, in frame 300-2, objects are detected and identified, including the pedestrian 120-2, the vehicle 130-2, the vegetation 140-2, and the street sign 150-2. Radar signal 320-2 of the pedestrian 120-2, the radar signal 330-2 of the vehicle 130-2, radar signal 340-2 of the vegetation 140-2, and radar signal 350-2 of the street sign 150-2 are received by the radar sensor 108 at a time corresponding to the time frame 300-2 is captured.

Generally, the automotive system 200 executes the automotive module 208 to perform a function. For example, the automotive module 208 can provide automatic cruise control and monitor for the presence of objects in or near the road 112. In such an example, the object-tracking module 110-1 provides the object tracks derived from the object probabilities output by the fusion submodule 210-3 to the automotive module 208. The automotive module 208 may provide alerts when the data obtained from the object-tracking module 110-1 indicate one or more objects are crossing in front of the vehicle 102.

In one scenario, in frame 300-1, the pedestrian 120-1, and the street sign 150-1 are in close proximity to one another. The imaging submodule 210-1 mis-identifies the pedestrian 120-1 as a second street sign due to foggy weather conditions in the example environment 100. In frame 2, the imaging submodule correctly identifies the pedestrian 120-2 but calculates a low probability that the pedestrian 120-1 and the pedestrian 120-2 are a same object. However, with the additional consideration of the radar signal 320-1 and the radar signal 320-2, the radar submodule 210-2 produces a high probability that these two radar signals are reflected off of a same object. The fusion submodule 210-3 calculates a refined probability, fused from the probability output by the imaging submodule 210-1 and the probability output by the radar submodule 210-2, that more accurately predicts that the pedestrian 120-1 and the pedestrian 120-2 are the same object. The object-tracking module 110-1 outputs this fused probability to the automotive module 208, which instructs the automotive system 200 that an object is tracking to move in front of the automotive system 200.

Example Architecture

Figure 4:
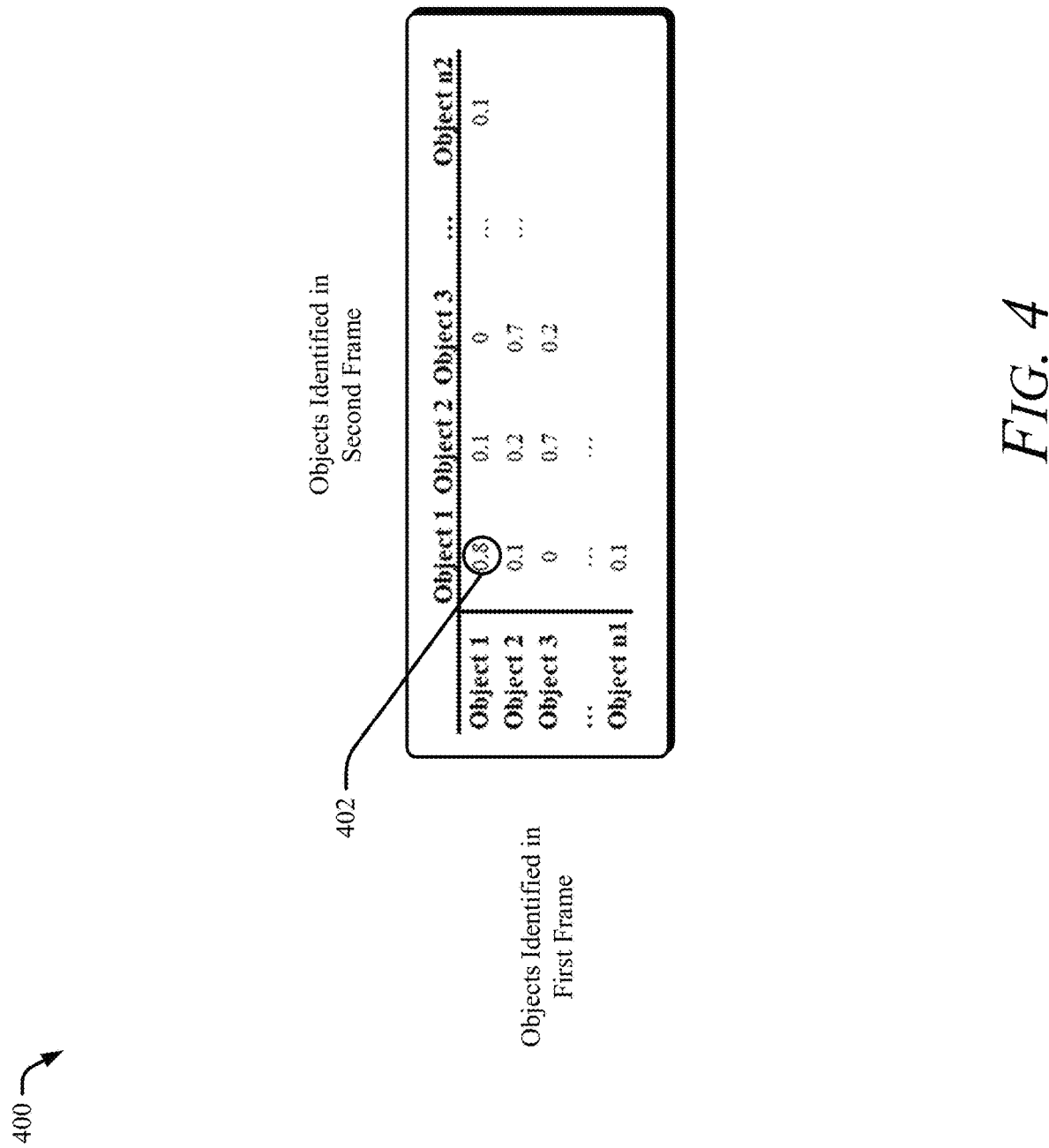
FIG. 4 illustrates an example data-association matrix.

FIG. 4 illustrates an example data-association matrix 400. The data-association matrix 400 is a set of probabilities that objects identified in one frame of captured data and objects identified in a second, consecutive frame of captured data are the same objects. The rows of data-association matrix 400 represent objects identified in the first frame captured. The columns of data-association matrix 400 represent objects identified in the second frame captured. Each element, such as element 402, of data-association matrix 400 is a probability that the object from the element's row and the object from the element's column are identical. The number of elements is dependent upon how many objects are identified in each frame. The data-association matrix 400 can associate objects identified by imaging-sensor data. Likewise, the data-association matrix 400 can associate radar data related to objects identified by imaging-sensor data. Imaging submodule 210-1, radar submodule 210-2, and fusion submodule 210-3 output data-association matrices similar to data-association matrix 400.

Figure 5:
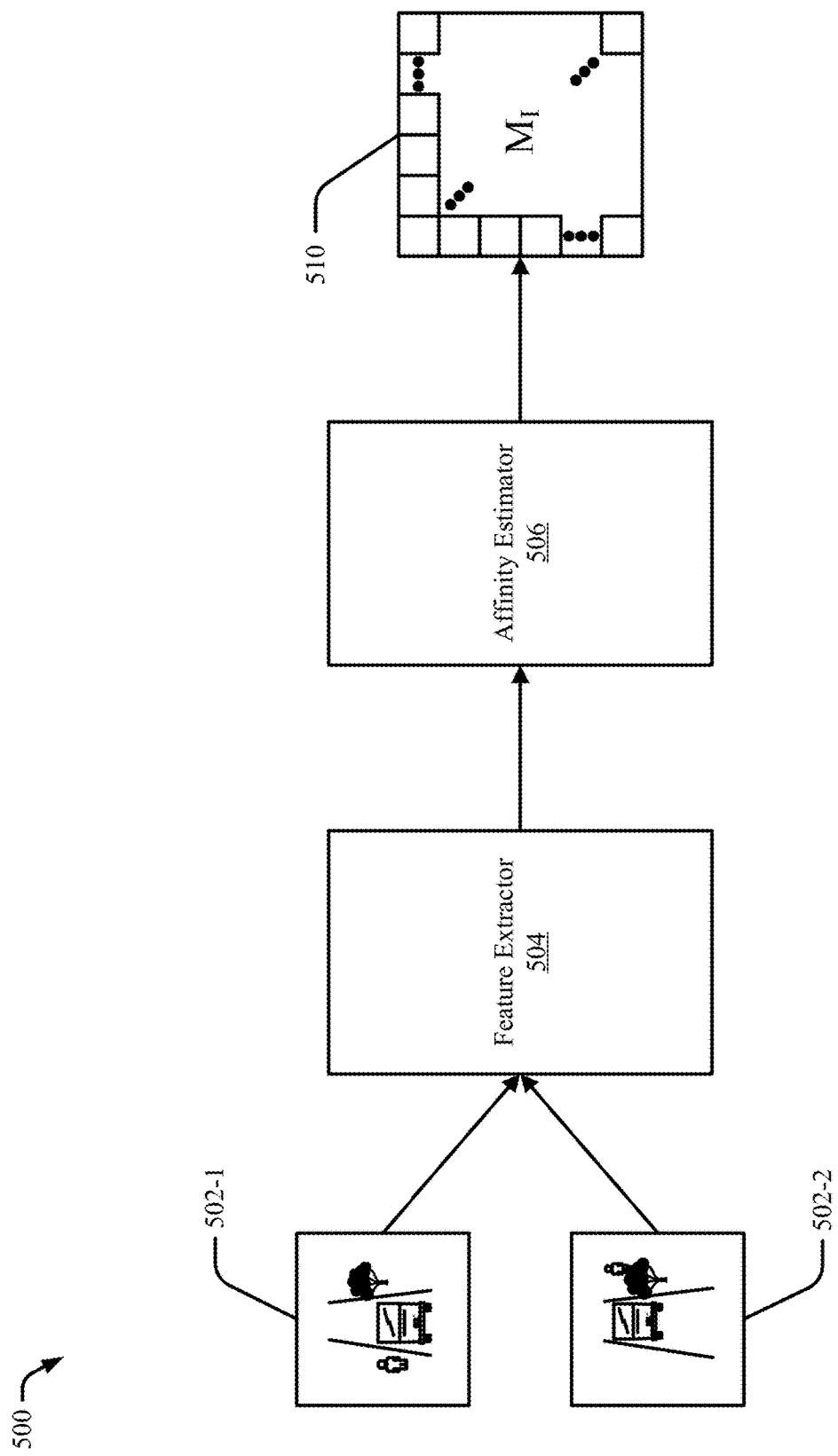
FIG. 5 illustrates an example imaging module outputting a data-association matrix.

FIG. 5 illustrates an example imaging module 500 similar to the imaging submodule 210-1. In this example, the imaging sensor is a camera, but the imaging sensor can be any type of sensor able to capture data in which one or more objects may be uniquely identified. Frame 502-1 and 502-2 are two frames captured consecutively by the imaging sensor 106. Frame 502-1 is the first frame, and 502-2 is the second frame. A feature extractor 504 identifies objects in each frame by extracting features and labels each object found in the two frames. The feature extractor 504 is implemented through machine learning, which can include a neural network, a convolutional neural network, a recurrent neural network, or any combination thereof. The neural network may be a known model such as Visual Geometry Group (VGG) or ResNet50, or the neural network may be a model of other design. The model is trained using a large dataset, such as the ImageNet image database. The affinity estimator 506 receives the list of objects, identified and labeled in the first frame, and the list of objects, identified and labeled in the second frame, and calculates a probability for each object in the second frame being the same object in the first frame. The probabilities are then output as a set, presented as a data-association matrix 510.

Figure 6:
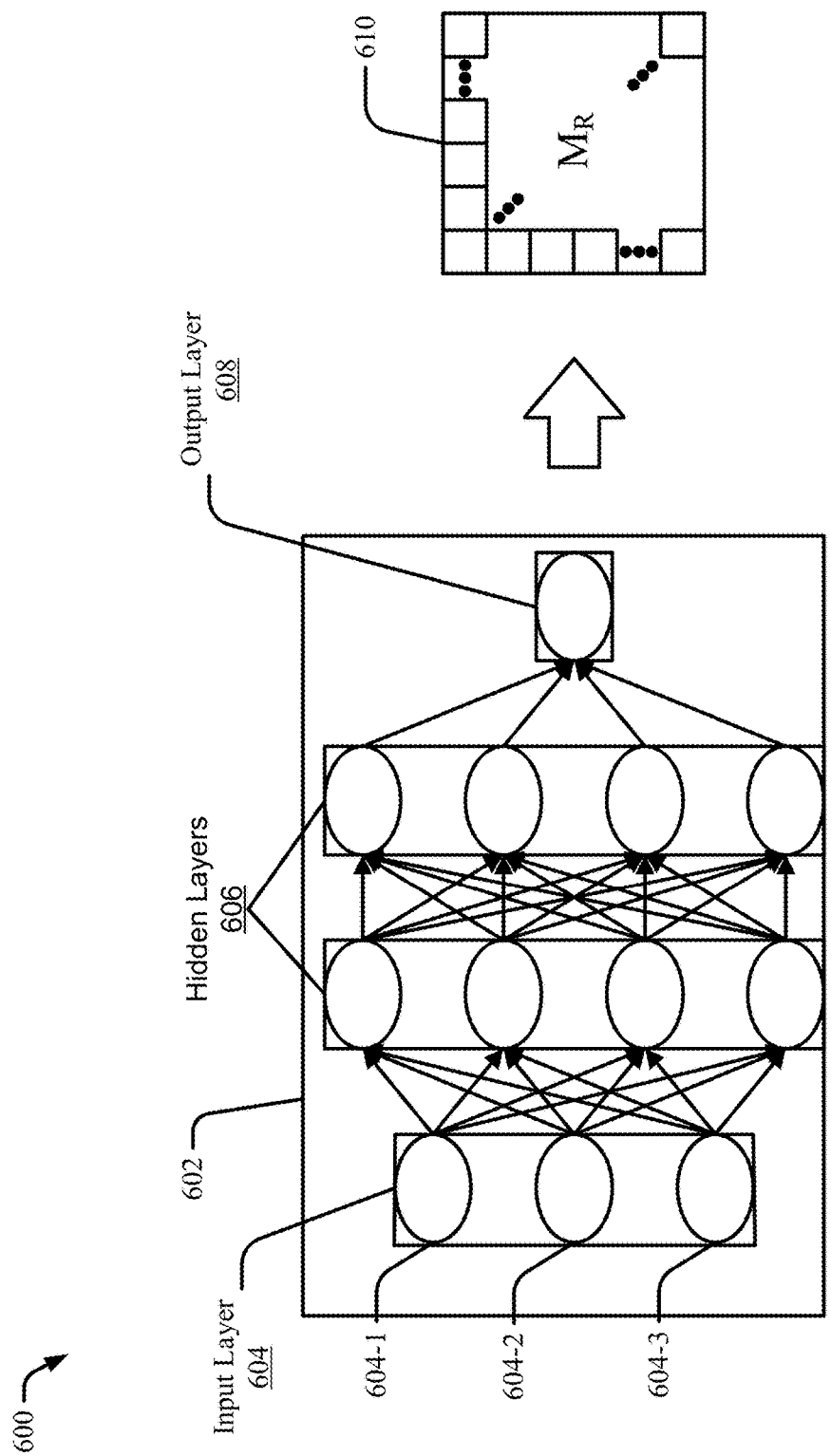
FIG. 6 illustrates an example radar module outputting a data-association matrix through a supervised learning neural network for a radar system.

FIG. 6 illustrates an example radar module 600 similar to the radar submodule 210-2. In this example, the radar module 600 uses a supervised learning neural network model 602 to output a data-association matrix. The example neural network 602 includes an input layer 604, hidden layers 606, and an output layer 608. Although two hidden layers are shown in the neural network 602, any number of hidden layers can be used. Radar signals related to objects identified in frames 502-1 and 502-2 are concatenated and input into input layer 604. The neural network 602 calculates a probability that each radar signal corresponding to the first frame of the imaging module 500 and each radar signal corresponding to the second frame of the imaging module 500 are associated with the same object as identified by the imaging module 500. The output layer 608 outputs the probabilities as a set presented as a data-association matrix 610.

Figure 7:
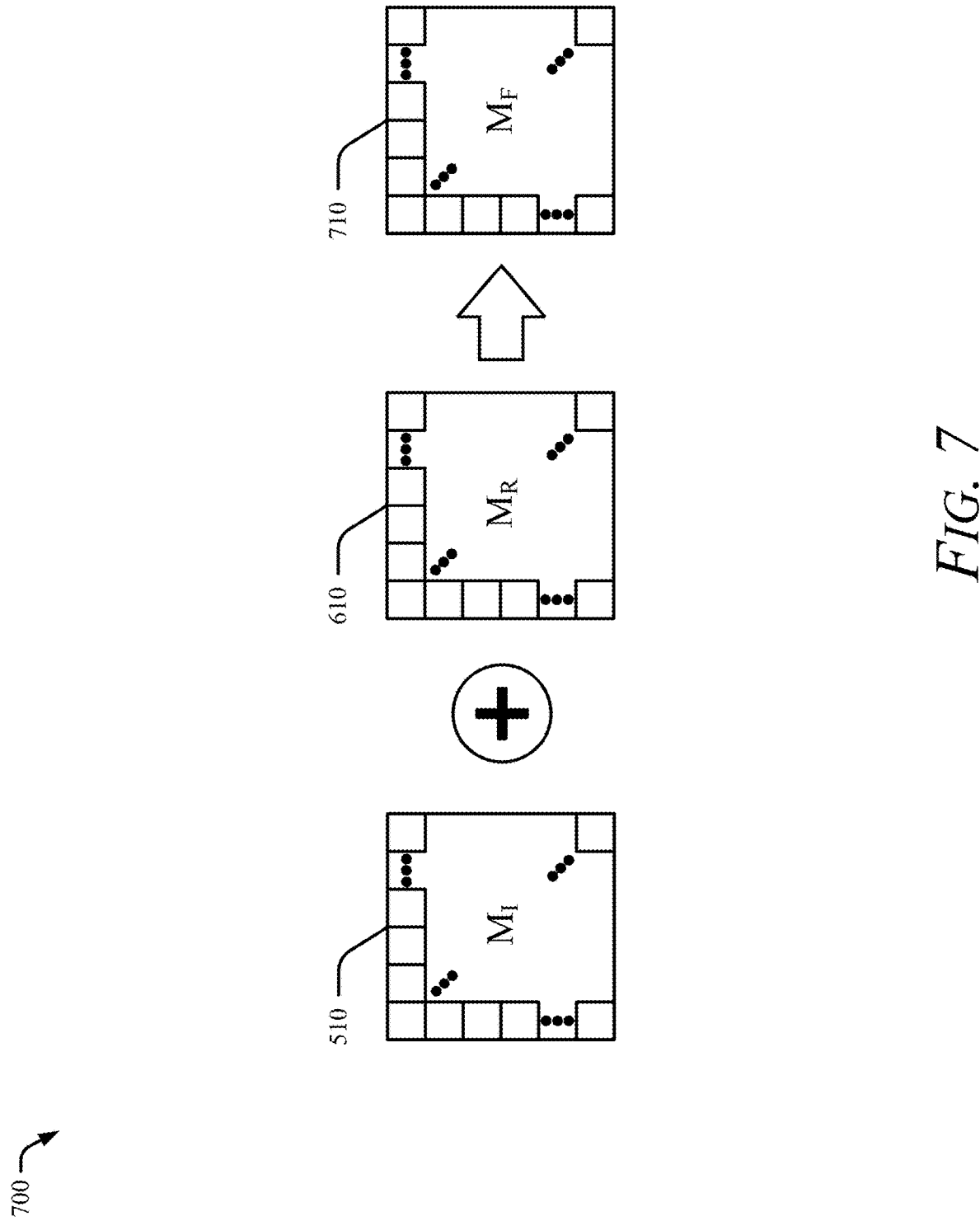
FIG. 7 illustrates an example of a refined object-association matrix generated by fusing an object-association matrix based on imaging-sensor data and an object-association matrix based on radar data.

FIG. 7 is an example fusion module 700 similar to the fusion submodule 210-3. The data-association matrix 510, output by the imaging module 500, and the data-association matrix 610, output by the radar module 600, are input into the fusion module 700. The fusion module 700 can fuse the elements of data-association matrix 510 with the elements of data-association matrix 610 by averaging, weighted averaging, through machine learning, or by any other means of calculation that results in fused data. The fusion module 700 outputs these probabilities as a set presented as a data-association matrix 710.

Example Methods

Figures 1, 8:
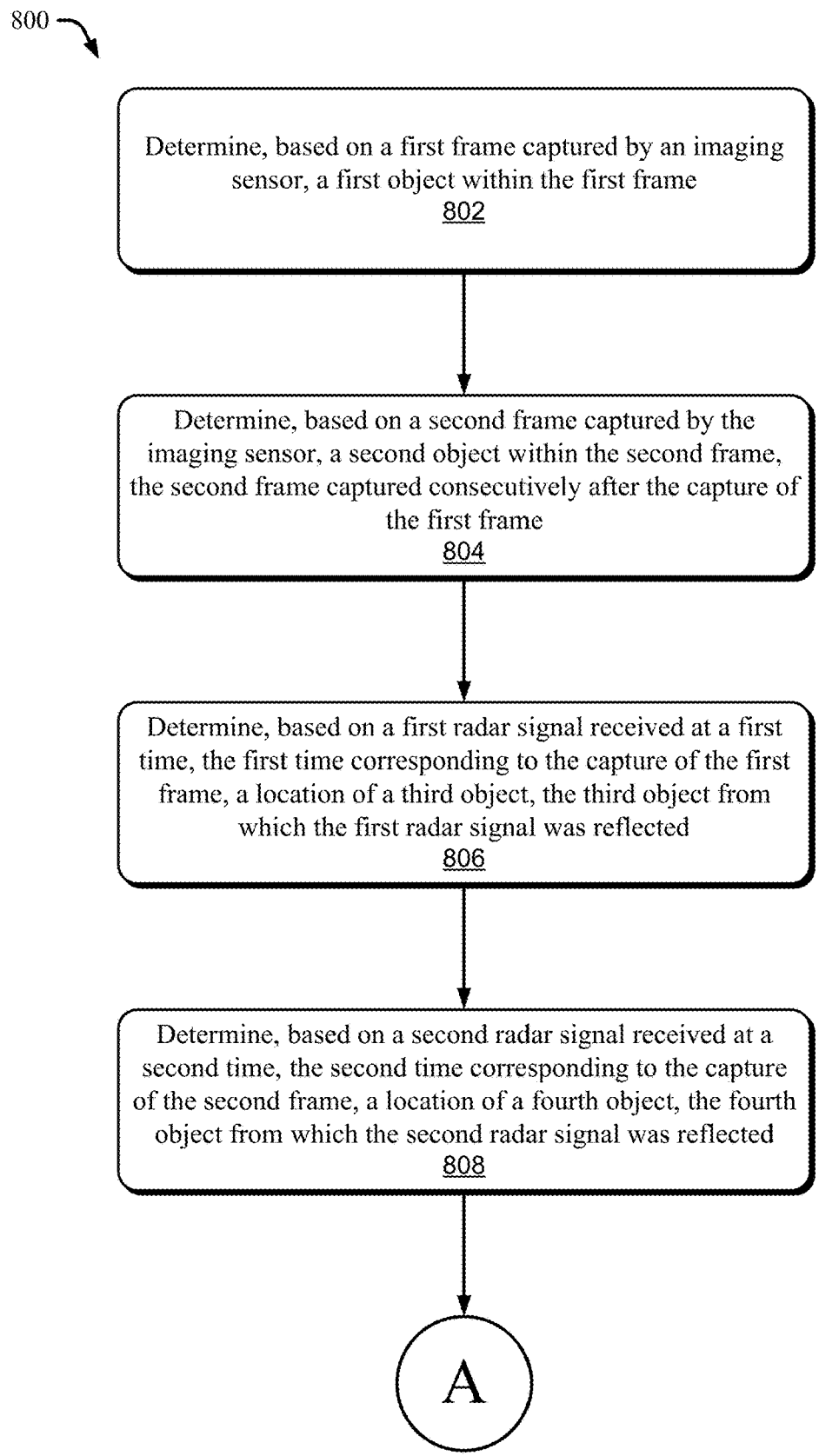
Figures 2, 8:
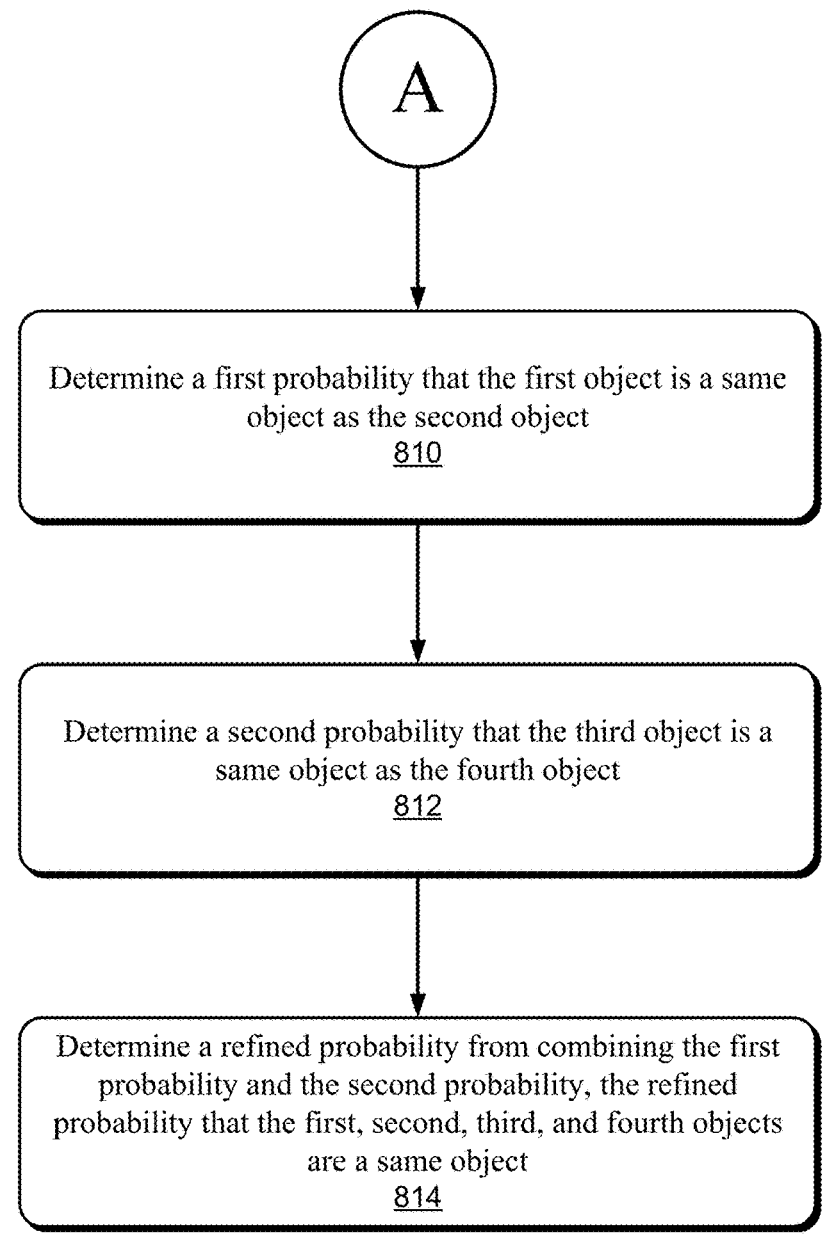

FIGS. 8-1 and 8-2 illustrate an example method for imaging and radar fusion for multiple-object tracking, in accordance with techniques of this disclosure. The method 800 is shown as a set of operations (or acts) performed in, but not limited to, the order or combinations in which the operations are shown or described. Further, any of the operations may be repeated, combined, or reorganized to provide other methods. In portions of the following discussion, reference may be made to the previously introduced figures in describing some non-limiting examples of method 800.

At 802, a first object is determined within a first frame captured by an imaging sensor. The imaging sensor may be an optical camera, a LiDAR, or any sensor able to capture an image from which an object can be identified. At 804, a second object is determined within a second frame captured by the imaging sensor, the second frame captured consecutively after the first frame.

At 806, a location of a third object is determined, based on a first radar signal received at a first time corresponding to the capture of the first frame, the third object from which the first radar signal was reflected. The radar signal may contain much data about the object, including but not limited to range, velocity, and azimuth angle from the host system. At 808, a location of a fourth object is determined, based on a second radar signal received at a second time corresponding to the capture of the second frame, the fourth object from which the second radar signal was reflected.

At 810, a first probability that the first object is a same object as the second object is determined. At 812, a second probability, that the third object is a same object as the fourth object, is determined. At 814, a refined probability that the first, second, third, and fourth objects are a same object is determined from combining the first probability and the second probability. At least one or more of the first probability, second probability, and third probability can be determined through machine learning. Machine learning can use a supervised learning neural network model to identify associations between at least two or more of the first, second, third, and fourth objects. The first probability, second probability, and refined probability can be presented as a data-association matrix.

By fusing data from two or sensors into refined data, in accordance with techniques of this disclosure, the refined data can be used to track multiple objects more reliably and accurately in a scene. Additionally, through machine learning, implemented by supervised learning neural network models, the reliability and accuracy of the refined data are further increased.

ADDITIONAL EXAMPLES

In the following section, additional examples of imaging and radar fusion for multiple-object tracking systems are provided.

Example 1. A method performed by an object tracking system, the method comprising determining, based on a first frame captured by an imaging sensor, a first object within the first frame; determining, based on a second frame captured by the imaging sensor, a second object within the second frame, the second frame captured consecutively after the capture of the first frame; determining, based on a first radar signal received at a first time, the first time corresponding to the capture of the first frame, a location of a third object, the third object from which the first radar signal was reflected; determining, based on a second radar signal received at a second time, the second time corresponding to the capture of the second frame, a location of a fourth object, the fourth object from which the second radar signal was reflected; determining a first probability that the first object is a same object as the second object; determining a second probability that the third object is a same object as the fourth object; and determining a refined probability from combining the first probability and the second probability, the refined probability that the first, second, third, and fourth objects are a same object.

Example 2. The method of example 1 further comprising: determining at least one or more of the first probability, second probability, or refined probability through machine learning.

Example 3. The method of any of the preceding examples, further comprising: determining the at least one or more of the first probability, second probability, or refined probability through machine learning using a supervised learning neural network model to identify associations between at least two or more of the first, second, third, and fourth objects.

Example 4. The method of any of the preceding examples, further comprising: determining the first probability, the first probability being presented as a first object association matrix; determining the second probability, the second probability being presented as a second object association matrix; and determining the refined probability, the refined probability being presented as a refined object association matrix based on the combining of the first object association matrix and the second object association matrix through machine learning.

Example 5. The method of any of the preceding examples, further comprising: capturing the first frame and the second frame with the imaging sensor, the imaging sensor being an optical camera capable of capturing an image in a visible light spectrum.

Example 6. The method of any of the preceding examples, further comprising: capturing the first frame and the second frame with the imaging sensor, the imaging sensor being a Light Detection and Ranging system.

Example 7. An object tracking system, the system comprising: an imaging sensor; a radar system; and one or more processors configured to: determine, based on a first frame captured by an imaging sensor, a first object within the first frame; determine, based on a second frame captured by the imaging sensor, a second object within the second frame, the second frame captured consecutively after the capture of the first frame; determine, based on a first radar signal received at a first time, the first time corresponding to the capture of the first frame, a location of a third object, the third object from which the first radar signal was reflected; determine, based on a second radar signal received at a second time, the second time corresponding to the capture of the second frame, a location of a fourth object, the fourth object from which the second radar signal was reflected; determine a first probability that the first object is a same object as the second object; determine a second probability that the third object is a same object as the fourth object; and determine a refined probability from combining the first probability and the second probability, the refined probability that the first, second, third, and fourth objects are a same object.

Example 8. The object tracking system of example 7, wherein the one or more processors are further configured to determine at least one or more of the first probability, second probability, or refined probability through machine learning.

Example 9. The object tracking system of any of the preceding examples, wherein the one or more processors are further configured to determine at least one or more of the first probability, second probability, or refined probability through machine learning using a supervised learning neural network model to identify associations between at least two or more of the first, second, third, and fourth objects.

Example 10. The object tracking system of any of the preceding examples, wherein the one or more processors are further configured to: determine the first probability, the first probability being presented as a first object association matrix; determine the second probability, the second probability being presented as a second object association matrix; and determine the refined probability, the refined probability being presented as a refined object association matrix based on the combining of the first object association matrix and the second object association matrix through machine learning.

Example 11. The object tracking system of any of the preceding examples, wherein: the imaging sensor is an optical camera capable of capturing an image in a visible light spectrum.

Example 12. The object tracking system of any of the preceding examples, wherein: the imaging sensor is a Light Detection and Ranging system.

Example 13. The object tracking system of any of the preceding examples, wherein the system operates as part of a safety system installed on an automotive vehicle.

Example 14. An object tracking system, the system comprising: means for determining, based on a first frame captured by an imaging sensor, a first object within the first frame; means for determining, based on a second frame captured by the imaging sensor, a second object within the second frame, the second frame captured consecutively after the capture of the first frame; means for determining, based on a first radar signal received at a first time, the first time corresponding to the capture of the first frame, a location of a third object, the third object from which the first radar signal was reflected; means for determining, based on a second radar signal received at a second time, the second time corresponding to the capture of the second frame, a location of a fourth object, the fourth object from which the second radar signal was reflected; means for determining a first probability that the first object is a same object as the second object; means for determining a second probability that the third object is a same object as the fourth object; and means for determining a refined probability from combining the first probability and the second probability, the refined probability that the first, second, third, and fourth objects are a same object.

Example 15. The object tracking system of example 14, the system further comprising: means for determining at least one or more of the first probability, second probability, or refined probability through machine learning.

Example 16. The object tracking system of any of the preceding examples, the system further comprising: means for determining at least one or more of the first probability, second probability, or refined probability through machine learning using a supervised learning neural network model to identify associations between at least two or more of the first, second, third, and fourth objects.

Example 17. The object tracking system of any of the preceding examples, the system further comprising: means for determining the first probability, the first probability being presented as a first object association matrix; means for determining the second probability, the second probability being presented as a second object association matrix; and means for determining the refined probability, the refined probability being presented as a refined object association matrix based on the combining of the first object association matrix and the second object association matrix through machine learning.

Example 18. The object tracking system of any of the preceding examples, wherein: the imaging sensor is an optical camera capable of capturing an image in a visible light spectrum.

Example 19. The object tracking system of any of the preceding examples, wherein: the imaging sensor is a Light Detection and Ranging system.

Example 20. The object tracking system of any of the preceding examples, wherein the system operates as part of a safety system installed on an automotive vehicle.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with multiple-object tracking can occur in other systems that resolve assignment problem where a quantity of agents or tasks is large. Therefore, although described as a way to improve vehicle-based object tracking techniques, the techniques of the foregoing description can be applied to other assignment problems to reduce a total number of assignments between tasks and agents.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method performed by an object tracking system, the method comprising:
   determining, based on a first frame captured by an imaging sensor, a first object within the first frame;
   determining, based on a second frame captured by the imaging sensor, a second object within the second frame, the second frame captured consecutively after the capture of the first frame;
   determining, based on a first radar signal captured by a radar sensor received at a first time, the first time corresponding to the capture of the first frame, a location of a third object, the third object from which the first radar signal was reflected, the radar sensor being a different type of sensor than the imaging sensor;
   determining, based on a second radar signal received at a second time, the second time corresponding to the capture of the second frame, a location of a fourth object, the fourth object from which the second radar signal was reflected;
   determining a first probability that the first object is a same object as the second object;
   determining a second probability that the third object is a same object as the fourth object;
   determining a refined probability from combining the first probability and the second probability, the refined probability that the first, second, third, and fourth objects are a same object; and
   outputting the refined probability to an automotive system for maneuvering a vehicle.

2. The method of claim 1, the method further comprising:
   determining at least one or more of the first probability, second probability, or refined probability through machine learning.

3. The method of claim 2, wherein:
   determining the at least one or more of the first probability, second probability, or refined probability through machine learning using a supervised learning neural network model to identify associations between at least two or more of the first, second, third, and fourth objects.

4. The method of claim 1, the method further comprising:
   determining the first probability, the first probability being presented as a first object association matrix;
   determining the second probability, the second probability being presented as a second object association matrix; and
   determining the refined probability, the refined probability being presented as a refined object association matrix based on the combining of the first object association matrix and the second object association matrix through machine learning.

5. The method of claim 1, the method further comprising:
   capturing the first frame and the second frame with the imaging sensor, the imaging sensor being an optical camera capable of capturing an image in a visible light spectrum.

6. The method of claim 1, the method further comprising:
   capturing the first frame and the second frame with the imaging sensor, the imaging sensor being a Light Detection and Ranging system.

7. An object tracking system, the system comprising:
   an imaging sensor;
   a radar system; and
   one or more processors configured to:
   determine, based on a first frame captured by an imaging sensor, a first object within the first frame;
   determine, based on a second frame captured by the imaging sensor, a second object within the second frame, the second frame captured consecutively after the capture of the first frame;
   determine, based on a first radar signal captured by a radar sensor received at a first time, the first time corresponding to the capture of the first frame, a location of a third object, the third object from which the first radar signal was reflected, the radar sensor being a different type of sensor than the imaging sensor;
   determine, based on a second radar signal received at a second time, the second time corresponding to the capture of the second frame, a location of a fourth object, the fourth object from which the second radar signal was reflected;
   determine a first probability that the first object is a same object as the second object;
   determine a second probability that the third object is a same object as the fourth object;
   determine a refined probability from combining the first probability and the second probability, the refined probability that the first, second, third, and fourth objects are a same object; and
   output the refined probability to an automotive system for maneuvering a vehicle.

8. The object tracking system of claim 7, wherein the one or more processors are further configured to:
   determine at least one or more of the first probability, second probability, or refined probability through machine learning.

9. The object tracking system of claim 8, wherein the one or more processors are further configured to:
determine at least one or more of the first probability, second probability, or refined probability through machine learning using a supervised learning neural network model to identify associations between at least two or more of the first, second, third, and fourth objects.

10. The object tracking system of claim 7, wherein the one or more processors are further configured to:
determine the first probability, the first probability being presented as a first object association matrix;
determine the second probability, the second probability being presented as a second object association matrix; and
determine the refined probability, the refined probability being presented as a refined object association matrix based on the combining of the first object association matrix and the second object association matrix through machine learning.

11. The object tracking system of claim 7, wherein:
the imaging sensor is an optical camera capable of capturing an image in a visible light spectrum.

12. The object tracking system of claim 7, wherein:
the imaging sensor is a Light Detection and Ranging system.

13. The object tracking system of claim 7, wherein the system operates as part of a safety system installed on an automotive vehicle.

14. An object tracking system, the system comprising:
means for determining, based on a first frame captured by an imaging sensor, a first object within the first frame;
means for determining, based on a second frame captured by the imaging sensor, a second object within the second frame, the second frame captured consecutively after the capture of the first frame;
means for determining, based on a first radar signal captured by a radar sensor received at a first time, the first time corresponding to the capture of the first frame, a location of a third object, the third object from which the first radar signal was reflected, the radar sensor being a different type of sensor than the imaging sensor;
means for determining, based on a second radar signal received at a second time, the second time corresponding to the capture of the second frame, a location of a fourth object, the fourth object from which the second radar signal was reflected;
means for determining a first probability that the first object is a same object as the second object;
means for determining a second probability that the third object is a same object as the fourth object;
means for determining a refined probability from combining the first probability and the second probability, the refined probability that the first, second, third, and fourth objects are a same object; and
means for outputting the refined probability to an automotive system for maneuvering a vehicle.

15. The object tracking system of claim 14, the system further comprising:
means for determining at least one or more of the first probability, second probability, or refined probability through machine learning.

16. The object tracking system of claim 15, the system further comprising:
means for determining at least one or more of the first probability, second probability, or refined probability through machine learning using a supervised learning neural network model to identify associations between at least two or more of the first, second, third, and fourth objects.

17. The object tracking system of claim 14, the system further comprising:
means for determining the first probability, the first probability being presented as a first object association matrix;
means for determining the second probability, the second probability being presented as a second object association matrix; and
means for determining the refined probability, the refined probability being presented as a refined object association matrix based on the combining of the first object association matrix and the second object association matrix through machine learning.

18. The object tracking system of claim 14, wherein:
the imaging sensor is an optical camera capable of capturing an image in a visible light spectrum.

19. The object tracking system of claim 14, wherein:
the imaging sensor is a Light Detection and Ranging system.

20. The object tracking system of claim 14, wherein the system operates as part of a safety system installed on an automotive vehicle.

* * * * *